Sept. 20, 1971  D. HEDERMANN  3,606,413
MECHANICAL COUPLING
Filed June 11, 1969

INVENTOR
DIETER HEDERMANN

BY Bryan and Butner
ATTORNEYS

United States Patent Office 3,606,413
Patented Sept. 20, 1971

---

3,606,413
MECHANICAL COUPLING
Dieter Hedermann, Immenstaad am Kippenhorn, Germany, assignor to Dornier G.m.b.H., Friedrichshafen/Bodensee, Germany
Filed June 11, 1969, Ser. No. 832,225
Claims priority, application Germany, Aug. 10, 1968,
P 17 75 466.4
Int. Cl. F16b 7/00
U.S. Cl. 287—94                                2 Claims

ABSTRACT OF THE DISCLOSURE

A pair of movable members have holes in the adjacent ends thereof, and a substantially cylindrical connecting member is disposed within each of these holes and extends on opposite sides of the associated movable member. An annular spring has passages therein receiving the movable members and is disposed around said connecting members with the inner periphery of the spring in engagement with the connecting members. End caps are mounted on the ends of each of the movable members and have arcuate inter-engaging surfaces thereon permitting angular movement of the movable members with respect to one another.

---

BACKGROUND OF THE INVENTION

The present invention relates to a mechanical coupling which is particularly adapted for coupling distributing slide valve servopistons, and especially to hydraulic or electrical hydraulic servovalves. In this type of application, the mechanical coupling serves to connect without play the slide rods of adjusting cylinders which are disposed in longitudinal alignment with one another.

Conventional servovalves include a distributing slide valve servopiston which is movable within a surrounding cylinder, the servopiston being shifted in an axial direction within the cylinder to achieve the desired operative position. The servopiston may be moved by a pressure medium such as a liquid, and the servopiston is adapted to open or close an associated hydraulic circuit depending upon its adjusted position.

In order to assure safety of operation as for example in aircraft and the like, several valves are connected in series. The individual distributing slide valve servopistons are connected with one another by slide rods and are made of one piece. The cylinders may also be made of one piece. This particular construction has a disadvantage in that the manufacture thereof is difficult and expensive. Additionally, divided sealing elements must be employed causing difficulties in sealing and requiring greater maintenance.

In another known servovalve arrangement, the slide valve servopistons and slide rods may be made of one piece, and the surrounding cylinder or casing is made of two pieces in order to avoid blocking of the remaining elements of the structure in case one of the distributing slide valve servopistons should become jammed in the associated cylinder.

A serious problem is encountered in the production of this type of construction since it is difficult to maintain the centricity of the longitudinal axes of the cylinders. If the bores of the cylinders are off-center, or if they are even at a slight angle to one another, there is a danger that the servopistons will become jammed or difficult to operate.

In the case of electro-hydraulic servovalves, it is important to provide an arrangement which is easily movable so that the servopiston can be operated with the least amount of power. In order to avoid the above discussed difficulties, a plurality of distributing slide valve servopistons have been connected in parallel wherein the slide rods are connected mechanically by plates. The latter type of construction is disadvantageous because of the separation of the cylinders and the sealing problem associated therewith.

SUMMARY OF THE INVENTION

In the present invention, a pair of adjacent movable slide rods are coupled to one another by connecting members which are operatively associated with the end portions of the slide rods, the connecting members in turn of being interconnected with one another by a coupling means in the form of an annular spring engaging the connecting members and having passages therethrough receiving the slide rods and permitting relative movement of the slide rods with respect to the annular spring.

In addition, end caps are mounted at the adjacent ends of each of the movable members and have arcuate interengaging surfaces which enable the movable members to freely assume various angular relationships with respect to one another.

With the construction of the present invention, any number of servovalves may be connected in series with another without any necessity for taking special measures to compensate for eccentricity of the longitudinal axes of the various devices and further which will guarantee proper operation of the apparatus even when the various devices are eccentric or have an angular relationship with respect to one another.

The coupling of the present invention does not exert any shearing forces on the associated servopistons, thereby preventing any tightness or jamming thereof. Accordingly, an individual distributing slide valve servopiston can be used for every subassembly, and any number of servovalves can be connected with one another.

DESCRIPTION OF THE PREFERRED EMBODIMENTS

Figure 1:
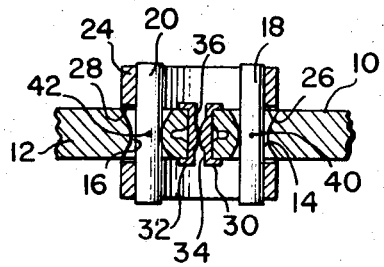
FIG. 1 is a longitudinal section through a first embodiment of the present invention.
Figure 2:
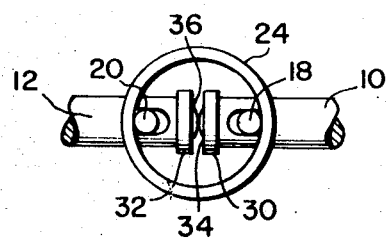
FIG. 2 is a top view of the structure shown in FIG. 1.

Referring now to the drawings where like reference characters designate corresponding parts throughout the several views, a first embodiment of the invention is shown in FIGS. 1 and 2 and includes a pair of slide rods 10 and 12. The end portions of slide rods 10 and 12 have holes 14 and 16 extending diametrically therethrough. Each of these holes is substantially circular in cross-section at the center of the associated slide rod, the holes flaring outwardly from the center toward opposite sides of the associated slide rods so as to define an elongated or oblong hole at the outer surface of the associated slide rod. This can be seen most clearly in FIG. 2 of the drawing.

A pair of connecting members 18 and 20, are disposed within holes 14 and 16 respectively and extend outwardly from opposite sides of the associated movable members. Each of these connecting members is substantially cylindrical in outer configuration, and as seen in FIG. 1, is disposed substantially perpendicular to the longitudinal axis of the associated movable member. Members 18 and 20 are held in place by friction. It will be noted that the shape of the holes 14 and 16 permits angular movement of members 10 and 12 with respect to the connecting members in a vertical plane as seen in this figure. The movable members may also move angularly in a horizontal plane with respect to the associated connecting members.

A coupling means in the form of an annular resilient spring 24 is provided, this spring extending around the connecting members 18 and 20 and having the inner periphery thereof in engagement with the connecting members. The annular spring is also provided with holes 26 and 28 which receive movable members 10 and 12 respectively, holes 26 and 28 being disposed diametrically opposite one another. Holes 26 and 28 are of greater dimension than the associated movable members 10 and 12 to permit angular movement of members 10 and 12 with respect to the annular spring. Annular spring 24 applies a certain amount of pre-tension to the connecting members in the operative position shown in FIG. 1.

End caps 30 and 32 are mounted on the ends of movable members 10 and 12 respectively and have interengaging surfaces 34 and 36 disposed to provide a point contact therebetween in all positions of the movable members. Surfaces 34 and 36 are arcuate in cross-sectional configuration and actually define portions of spheres. Surfaces 34 and 36 are each formed on arcs having a radius disposed at the intersection of the axes of the associated movable member and connecting member. The centers about which surfaces 34 and 36 are formed are indicated by reference characters 40 and 42 in FIG. 1.

Figure 3:
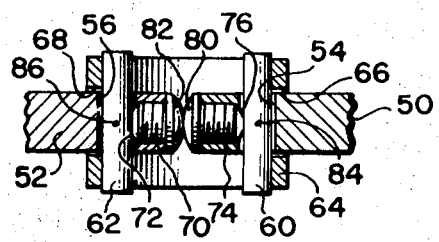
FIG. 3 is a view similar to FIG. 1 showing a modified form of the invention.

Referring now to FIG. 3 of the drawing, a modification is illustrated wherein a pair of slide rods 50 and 52 correspond to slide rods 10 and 12 previously described. Rods 50 and 52 have holes 54 and 56 formed diametrically therethrough, these holes being in this case cylindrical bores for simplicity of production.

Cylindrical connecting members 60 and 62 are positioned within the bores and extend laterally from opposite sides of the associated movable members, and are held in place by friction. An annular spring 64 corresponding to spring 24 previously described is provided, this spring having holes 66 and 68 formed through diametrically opposite sides thereof. These holes are larger than the associated movable members which extend therethrough whereby the movable members may move with respect to the annular spring, in the same manner as heretofore described.

A threaded member 70 is threaded within a correspondingly threaded bore extended longitodinally of movable member 52. Member 70 is provided with an arcuate end surface 72 which defines a portion of the sphere and which engages connecting member 62.

A further threaded member 74 similar to member 70 is threaded within a correspondingly threaded longitudinal bore in movable member 50. Member 74 has an arcuate end surface 76 similar to the end surface 72, surface 76 engaging connecting member 60.

End caps 80 and 82 are supported on the ends of movable members 50 and 52 respectively, these end caps having arcuate interengaging surfaces with a center at the intersection of the axes of the associated movable member and the connecting member. The centers of curvature for the end surfaces 80 and 82 are indicated by references 84 and 86 in FIG. 3 of the drawings.

It will be obvious to those skilled in the art that many modifications may be made within the scope of the present invention without departing from the spirit thereof, and the invention includes all such modifications.

What is claimed is:

1. A mechanical coupling comprising a pair of movable members to be coupled to one another, the ends of the movable members being in contact and having a spherical configuration, bore means extending through each of the movable members in a direction normal to the longitudinal axis thereof, connecting means in each of the bore means, and a single annular spring means enclosing both projecting ends of both of the connecting means.

2. A mechanical coupling comprising a pair of movable members to be coupled to one another, the ends of the movable members having end caps thereon in contact with each other, bore means extending through each of the movable members in a direction normal to the longitudinal axis thereof, connecting means in each of the bore means, and a single annular spring means enclosing both projecting ends of both of the connecting means.

References Cited

UNITED STATES PATENTS

| Re. 16,829 | 12/1927 | Francke | 64—15 |
| 3,297,291 | 1/1967 | Everett | 287—92X |
| 1,250,169 | 12/1917 | Heidt | 287—92X |
| 1,915,399 | 6/1933 | Bibby | 64—15B |
| 2,945,714 | 7/1960 | Egger | 287—86 |
| 2,106,672 | 1/1938 | Wollner | 64—21 |
| 972,445 | 10/1964 | Walden | 64—11 |

FOREIGN PATENTS

| 815,011 | 6/1959 | Great Britain | 287—92 |
| 115,923 | 2/1946 | Sweden | 64—15 |

DAVID J. WILLIAMOWSKY, Primary Examiner

W. L. SHEDD, Assistant Examiner

U.S. Cl. X.R.

64—15